Jan. 20, 1970 W. W. ANTRIM 3,490,294
VARIABLE RATIO ACTUATING MECHANISM
Filed June 21, 1968 2 Sheets-Sheet 1

INVENTOR.
Warren W. Antrim
BY
C. J. Biskup
ATTORNEY

Jan. 20, 1970   W. W. ANTRIM   3,490,294
VARIABLE RATIO ACTUATING MECHANISM
Filed June 21, 1968   2 Sheets-Sheet 2

INVENTOR.
Warren W. Antrim
BY
E. J. Biskup
ATTORNEY

United States Patent Office 3,490,294
Patented Jan. 20, 1970

1

3,490,294
VARIABLE RATIO ACTUATING MECHANISM
Warren W. Antrim, Dayton, Ohio, assignor to General Motors Corporation, Detroit, Mich., a corporation of Delaware
Filed June 21, 1968, Ser. No. 738,894
Int. Cl. G05g 1/04
U.S. Cl. 74—516                                    4 Claims

ABSTRACT OF THE DISCLOSURE

A variable ratio actuating mechanism for converting linear motion to modulated rotary motion wherein a first cam member is fixedly secured to a shaft and has an involute surface formed thereon that is in mutual rolling engagement with and driven by an involute surface formed on a second cam member. The cam members are pivotally interconnected by a link member and upon linear actuation of the second cam member, the involute surfaces roll upon each other and the mechanical advantage of the mechanism steadily decreases until the shaft rotates through a predetermined angle. Thereafter, the cam members and the link member are locked together and continued actuation of the mechanism proceeds at a constant mechanical advantage.

---

To achieve a greater sensitivity in the control of engine speed in the lower range, it has been proposed to incorporate a variable ratio lever mechanism in the engine throttle control linkage. These mechanisms are usually designed such that a greater amount of accelerator pedal displacement is required to cause a given throttle opening as compared to a conventional throttle control linkage having a linear relationship between throttle opening and pedal displacement.

For example, a pair of rollers may be installed on the throttle control lever adjacent the accelerator pedal thereby providing two distinct ratios for the throttle control linkage. However, to provide a smooth transition between the initial slow throttle opening rate and the more rapid rate, additional structural elements are necessary. Other constructions have been proposed wherein a constantly decreasing lever arm is incorporated in the throttle control linkage to provide a constantly varying throttle opening rate. However, such arrangements are not entirely satisfactory. Inasmuch as the mechanism operates over the full amount of throttle opening, the desirable effect of a constantly varying slow throttle operating rate is proportionately diminished at the lower engine speeds.

The present invention contemplates a variable ratio throttle actuating mechanism wherein a slow throttle opening rate and a high mechanical advantage or ratio is provided upon initial throttle opening which continuously increases until a predetermined opening. For continued actuation thereafter, the throttle opening rate and the mechanical advantage of the mechanism remain essentially constant. In this manner, the relative movements of the throttle are such that a large accelerator pedal displacement is required to produce a given throttle opening increment in the lower engine speed range and a lesser pedal displacement is required to produce the same throttle increment in the upper engine speed range.

More specifically, the present invention utilizes the rolling contact between involute surfaces formed on cam members attached to the throttle shaft and the throttle linkage, respectively. A carrier link pivotally interconnects the cam members and serves to maintain the involute surfaces in rolling contact. Upon initial actuation, the mechanism possesses a slow throttle opening rate and

2 a high mechanical advantage or ratio. The opening rate steadily increases and the mechanical advantage decreases as the involute surfaces roll upon each other and the point of contact therebetween moves closer to the throttle shaft. After the throttle shaft is rotated through a predetermined angle, the cam members and carrier link are locked together and continued actuation of the throttle control linkage opens the throttle at an essentially constant rate and mechanical advantage.

Accordingly, the objects of the present invention are: to provide a variable ratio actuating mechanism having a continuously varying ratio for initial actuation and a constant ratio for actuation thereafter; to provide a variable ratio actuating mechanism for converting linear motion to modulated rotary motion wherein a pair of cam members having involute surfaces in mutual rolling engagement interact to form a mechanism having a steadily decreasing mechanical advantage; to provide a variable ratio throttle control mechanism wherein a first cam member is rotatably connected to a throttle shaft and is driven by a second cam member actuated by an accelerator pedal, the cam members having involute surfaces formed thereon that are operatively connected such that pure rolling contact is maintained therebetween and the mechanical advantage of the mechanism continuously decreases as the throttle is opened thereby achieving greater throttle sensitivity at low engine speeds; and to provide a variable ratio throttle actuating mechanism for a throttle control linkage of a motor vehicle wherein a pair of cam members having mutually engaging involute surfaces formed thereon are respectively connected to the throttle shaft and a throttle actuating link and pivotally interconnected by a carrier link, the arrangement being such that upon initial actuation the mechanical advantage of the mechanism continuously decreases until the throttle shaft has rotated through a predetermined angle and, thereafter, remains essentially constant whereby a greater throttle sensitivity is achieved in the low speed driving range.

These and other objects will be apparent to one skilled in the art upon reading the following detailed description, reference being made to the accompanying drawings in which.

Figure 1:
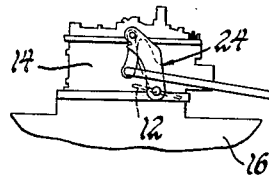
FIGURE 1 is an elevational view of a variable ratio actuating mechanism as applied in a motor vehicle between the accelerator pedal and the carburetor throttle.

Referring to FIGURE 1, there is shown a throttle control linkage 10 installed on a motor vehicle. The throttle control linkage 10 operates in a conventional manner to control the opening and closing of a throttle 12 of an associated carburetor 14 so as to regulate the speed of an internal combustion engine 16.

The throttle control linkage 10 more specifically comprises an accelerator pedal 18, a throttle control lever 20, a throttle control link 22, and a variable ratio actuating mechanism 24. The lower end of the accelerator pedal 18 is connected at a pivot support 25 to the vehicle fire wall 26 adjacent the floor panel 27. The throttle control lever 20 is pivotally connected to the fire wall 26 at an intermediate portion 28. The lower end of throttle control lever 20 includes a roller 30 that engages the upper end of the accelerator pedal 18. The upper end of the throttle control lever 20 is pivotally connected to one end of the throttle control link 22 by a pin connection 32. A tensioned throttle return spring 34 is connected between a bracket 36 attached to the fire wall 26 and the upper portion of the throttle control lever 20 and urges the throttle control linkage in a counterclockwise or throttle closing direction.

Figure 2:
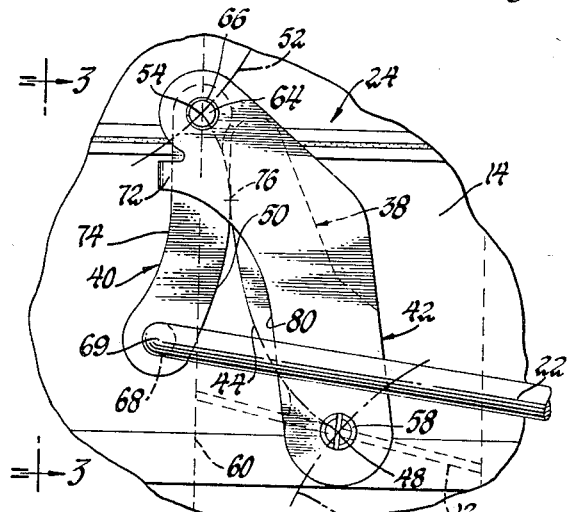
FIGURE 2 is an enlarged elevational view showing the variable ratio actuating mechanism of FIGURE 1 with the throttle in a closed position.

Referring to FIGURE 2, the variable ratio actuating mechanism 24 comprises a first plate cam 38, a second plate cam 40 and a carrier link 42. The first plate cam 38 has an involute surface 44 formed thereon having an origin with a base circle 46 at the axis of a pin connection 48. The second plate cam 40 has an involute surface 50 formed thereon having an origin with a base circle 52 at the axis of a pin connection 54.

Figure 3:
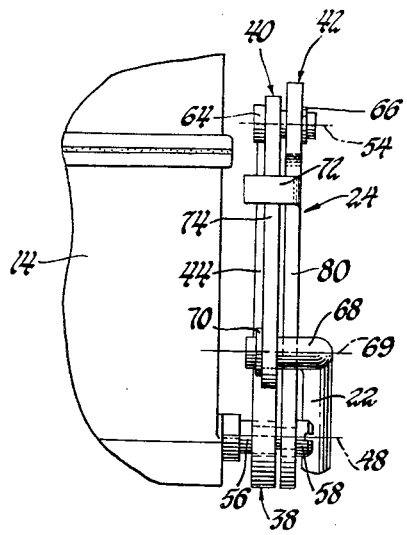
FIGURE 3 is a view taken along line 3—3 in FIGURE 2.

As shown in FIGURE 3, the pin connection 48 comprises a throttle shaft 56 having a screw 58 threaded therewithin. The lower end of the first plate cam 38 is fixedly connected to the throttle shaft 56 for rotation therewith. The lower end of the carrier link 42 is rotatably supported by the screw 58 for pivotal movement about the pin connection 48. As will be appreciated, a rotation of the first plate cam 38 will similarly rotate the throttle shaft 56 so as to control the opening and closing of the throttle 12. In a conventional manner, the throttle 12 regulates the passage of combustible gases through a mixture conduit 60 in the carburetor 14 so as to control the speed of the internal combustion engine 16.

The upper ends of the second plate cam 40 and the carrier link 42 are pivotally connected to the pin connection 54 by a shouldered pin 64 and a snap ring 66. The lower end of the second plate cam 40 is pivotally connected to an inwardly turned end 68 of the throttle control link 22 at a pin connection 69. A snap ring 70 secures the throttle control link 22 and the second plate cam 40 in assembled relationship.

The carrier link 42 further includes an inwardly turned tang 72 that engages the trailing edge 74 of the second plate cam 40 thereby forming a stop for counterclockwise rotation of the actuating mechanism 24 about pin connection 48 when the throttle 12 is in the fully closed position illustrated in FIGURE 2. In this position, it will be noted that the involute surfaces 44 and 50 are in mutual rolling engagement at point 76. Thus, the mechanism 24 has a mechanical advantage determined by the relative lengths between the point 76 and pin connections 69 and 54.

Figure 4:
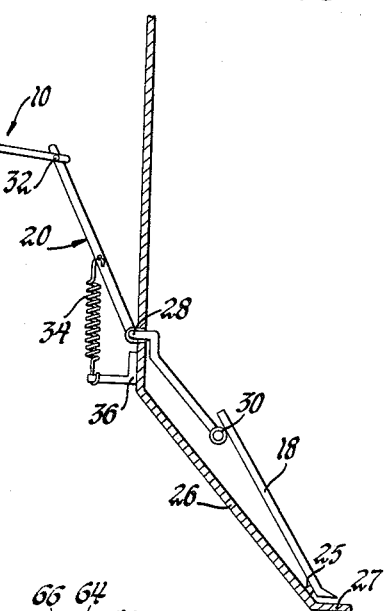
FIGURES 4 and 5 are views similar to FIGURE 2 showing the variable ratio actuating mechanism as the throttle is progressively opened.
Figure 4:
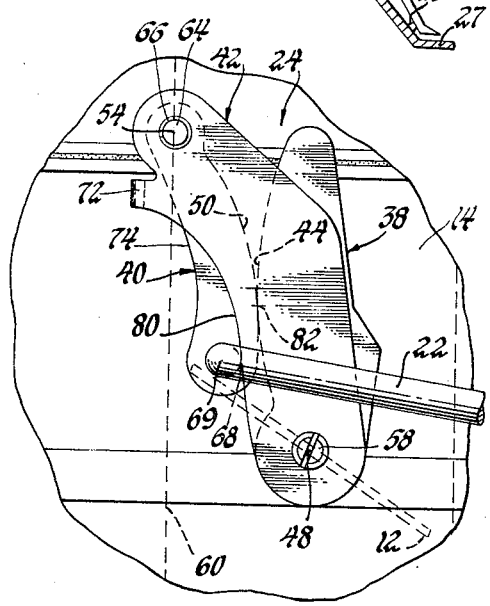
Figure 7:
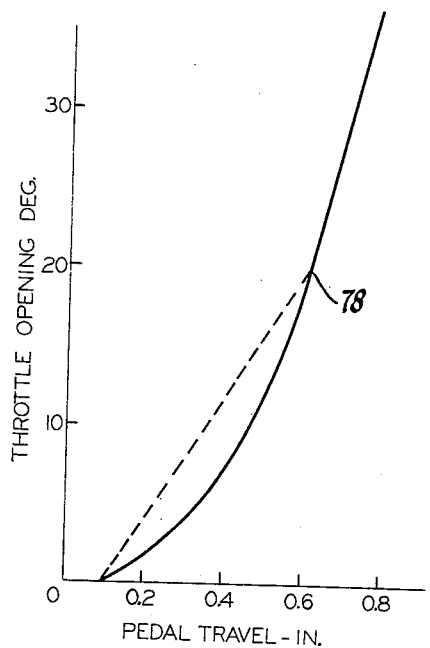
FIGURE 7 is a graph illustrating the accelerator pedal travel related to the throttle opening for the variable ratio actuating mechanism shown in FIGURES 1 through 6.

When the accelerator pedal 18 is depressed, the throttle control link 22 is linearly shifted to the right and after a predetermined throttle rotation will assume the relative position illustrated in FIGURE 4. As the involute surfaces 44 and 50 of the plate cams 38 and 40, respectively, roll upon each other between the fully closed position shown in FIGURE 2 and the partially opened position shown in FIGURE 4, the point of contact therebetween shifts downwardly toward the connection 48. Thus, those skilled in the art will appreciate that the mechanical advantage and ratio of the mechanism is steadily decreasing inasmuch as the lever arm represented by the distance between the point of contact and the connection 48 is progressively decreasing. Referring to FIGURE 7 wherein the throttle opening is graphically related to accelerator pedal travel, it will be noted that a greater and constantly varying amount of accelerator pedal travel is required to produce a given amount of throttle opening. This deviation from a linear linkage shown by the dotted lines represents a zone wherein the pedal displacement is modulated with respect to the throttle opening. Consequently, the lower throttle opening rate produced thereby provides a greater sensitivity in the control of engine speed in a range corresponding to the lower driving speeds.

Figure 5:
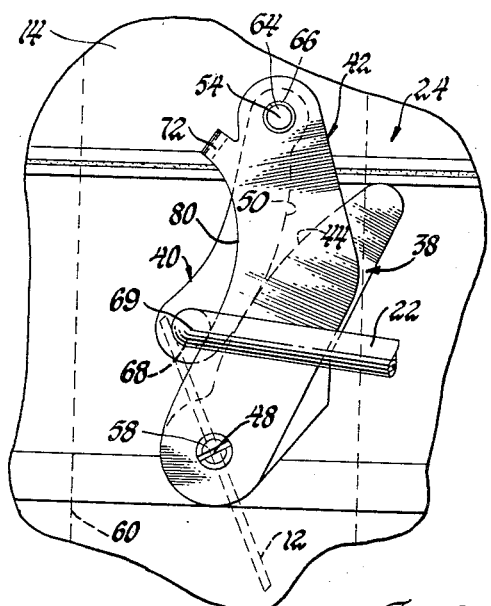
Figure 6:
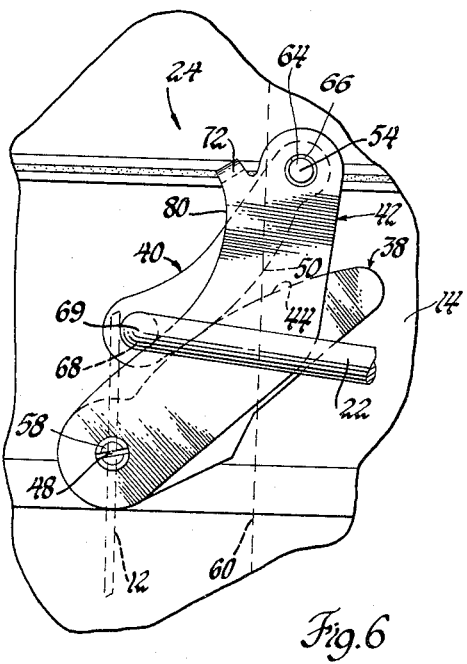
FIGURE 6 is a view smiliar to FIGURE 2 showing the variable ratio actuating mechanism with the throttle in the fully opened position.

The position of throttle 12 shown in FIGURE 4 corresponds to a transition point 78 shown in FIGURE 7 between the linear phase of operation of the variable ratio actuating mechanism 24 and the constantly varying phase previously described. In the FIGURE 4 position, the inwardly turned end 68 of the throttle control link 22 abuts the trailing edge 80 of the carrier link 42 thereby locking the plate cams 38 and 40 and the carrier link 42 in a fixed relationship wherein the involute surfaces 50 and 44 are in mutual rolling engagement at point 82 and the mechanical advantage of the mechanism 24 is determined in a conventional manner by the relative distances between the aforementioned point and the connections 69 ad 54. Thereafter, as the throttle 12 is moved to the partially opened position illustrated in FIGURE 5 and thence to the fully opened position illustrated in FIGURE 6, the mechanical advantage and throttle opening rate of the mechanism remains essentially constant. When the accelerator pedal 18 is released, a throttle return spring (not shown) urges first plate cam 38 in a counterclockwise throttle closing direction and the throttle return spring 34 urges the throttle control link 22 to the left, the second plate cam 40 in a clockwise direction about the pin connection 54, and the carrier link 42 in a counterclockwise direction about the pin connection 48.

In a preferred construction of the embodiment described above, the base circles 46 and 52 have equal diameters and, accordingly, the involute surfaces 44 and 50 have similar curvatures. To maintain the involute surfaces in constant rolling contact, the distance between the pin connections 48 and 54 is equal to the radius of the aforementioned base circles 46 and 52. As shown in FIGURE 7, a 20° throttle opening was chosen for the variable ratio phase of operation. This range encompasses the constantly varying throttle settings corresponding to engine speeds commonly encountered in stop-and-go city driving. In this connection, it should be noted that the above-described dimensions of the base circles 46 and 52 may be relatively varied. However, proper account should be taken of the distance between pin connections 54 and 48 to compensate for this change. Also, it will be recognized that the cam surfaces other than the above-described involutes can be used. For example, it is contemplated that the mechanism 24 could incorporate hypercycloidal surfaces having generating circles corresponding to the aforementioned base circles. Additionally, it will also be appreciated that other cam surfaces can be used for plate cams 38 and 40, the only requirement being that the same be designed for essentially pure rolling contact until the throttle 12 has reached a predetermined angular opening.

Although only one form of this invention has been shown and described, other forms will be readily apparent to those skilled in the art. Therefore, it is not intended to limit the scope of this invention by the embodiment selected for the purpose of this disclosure but only by the claims which follow.

I claim:

1. A throttle control linkage for controlling the opening and closing of a throttle from a manually operable pedal so as to control the speed of an internal combustion engine, comprising: a driving member; linking means interconnecting the pedal and the driving member; a driven member operatively connected to the throttle for rotation therewith between a closed and open position; a link member rotatably supported at one end by said throttle and pivotally connected at the other end to said driving member; cam surfaces formed on the driving and driven members adapted to roll upon each other without slipping to thereby continuously vary the ratio of the linkage as the pedal is displaced; spring means biasing said throttle to said closed position and said driving and driven members into rolling engagement; and means preventing relative movement between said driven and driving members after said throttle has rotated past a partially open position whereby the ratio of said linkage will remain essentially constant as said pedal is displaced to rotate the throttle past said partially open position.

2. An actuating mechanism for regulating motion between an actuator member and a rotatable controlled member, comprising: a first cam member operatively connected to the actuator member; a second cam member operatively connected to the controlled member for rotation therewith; a link member rotatably supported at one end by said controlled member and pivotally connected at the other end to said first cam member; cam surfaces formed on said first and second cam members, said cam surfaces adapted to be in pure rolling engagement at continuously varying contact points as said second cam member and said controlled member rotate between a first position and a second position such that the ratio of said mechanism is continuously varied therebetween; and means locking said first and second cam members and said link member in fixed relationship and maintaining the ratio of said mechanism essentially constant for a rotation of said controlled member past said second position.

3. A variable ratio actuating mechanism for converting linear motion of an actuator member to modulated rotary motion of a controlled member, comprising: a first cam member having an involute surface formed thereon generated from a first base circle, said first cam member operatively connected to the controlled member for rotation therewith at a first connection located at the origin of said involute surface with said first base circle; a second cam member having an involute surface formed thereon generated from a second base circle; a link member for interconnecting the cam members, said link member pivotally connected to said second cam member at a second connection located at the origin of the involute surface with said second base circle, the spacing between said connections being equal to one quarter of the sum of the diameters of said base circles; and stop means for preventing relative movement between said link member and said cam members for continued rotation of the controlled member after predetermined rolling contact between said involute surfaces whereby the ratio of the mechanism continuously varies from initial actuation until said predetermined rolling and thereafter remains essentially constant.

4. A variable ratio mechanism for regulating motion between an actuator member and a rotatable controlled member, comprising: a first cam member having an involute surface formed thereon and operatively connected to the controlled member at a first connection for rotation therewith; a second cam member having an involute surface formed thereon pivotally connected to the actuator member at a second connection; link means for maintaining said involute surfaces in rolling contact as said first cam member moves relative to said second cam member, said link means pivotally connected to said second cam member at a third connection and to said controlled member at said first connection whereby upon initial actuation of said actuator member, said second cam member rotates about said third connection thereby driving said first cam member and rotating said controlled member about said first connection such that the mechanical advantage of the mechanism constantly decreases as the point of rolling contact between the involute surfaces moves closer to said second connection; and means for locking said cam member in fixed relationship after said controlled member has rotated through a predetermined angle and for maintaining said fixed relationship and thereby a constant mechanical advantage for continued actuation of the mechanism.

References Cited
UNITED STATES PATENTS

| | | | |
|---|---|---|---|
| 2,436,897 | 3/1948 | Nutt | 74—516 |
| 2,869,393 | 1/1959 | Hutchison | 74—516 |
| 2,927,476 | 3/1960 | Hutzenlaub | 74—513 |
| 3,264,896 | 8/1966 | Gorsky | 74—516 |
| 3,304,798 | 2/1967 | Puidokas | 74—513 |

HALL C. COE, Primary Examiner

U.S. Cl. X.R.

74—513